US010509526B2

(12) United States Patent
Yang et al.

(10) Patent No.: US 10,509,526 B2
(45) Date of Patent: Dec. 17, 2019

(54) THREE-DIMENSIONAL TOUCH CONTROL STRUCTURE AND DISPLAY DEVICE

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Ruizhi Yang, Beijing (CN); Yanqing Chen, Beijing (CN); Yanfeng Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 134 days.

(21) Appl. No.: 15/259,459

(22) Filed: Sep. 8, 2016

(65) Prior Publication Data

US 2017/0269767 A1 Sep. 21, 2017

(30) Foreign Application Priority Data

Mar. 21, 2016 (CN) .......................... 2016 1 0162051

(51) Int. Cl.
*G06F 3/046* (2006.01)
*G06F 3/041* (2006.01)
(Continued)

(52) U.S. Cl.
CPC .......... *G06F 3/046* (2013.01); *G02F 1/13338* (2013.01); *G02F 1/133528* (2013.01); *G06F 3/0412* (2013.01)

(58) Field of Classification Search
None
See application file for complete search history.

(56) References Cited

U.S. PATENT DOCUMENTS 8,432,371 B2 * 4/2013 Hotelling .............. G06F 3/0412 345/104
2011/0012760 A1 * 1/2011 Klinghult .............. G06F 3/0414 341/32

(Continued)

FOREIGN PATENT DOCUMENTS

CN 102200873 A 9/2011
CN 102473048 A 5/2012

(Continued)

OTHER PUBLICATIONS

ElectronicsTutorials ("The Electromagnet", 2015, https://www.electronics-tutorials.ws/electromagnetism/electromagnets.html) (Year: 2015).*

(Continued)

*Primary Examiner* — Xin Sheng
(74) *Attorney, Agent, or Firm* — Ladas & Parry LLP

(57) ABSTRACT

Disclosed are a three-dimensional (3D) touch control structure and a display device. The three-dimensional (3D) touch control structure includes: a plurality of magnetic field generating components arranged into an array, and a plurality of electromagnetic inducting components in one-to-one correspondence and arranged in different layers to the magnetic field generating components; wherein a distance exists between the magnetic field generating components and the corresponding electromagnetic inducting components, and the magnetic field generating components are configured for generating magnetic fields and the electromagnetic inducting components are configured for changing in induced potential during touch control.

14 Claims, 3 Drawing Sheets

501
101
102
502

(51) Int. Cl.
*G02F 1/1333* (2006.01)
*G02F 1/1335* (2006.01)

(56) References Cited

U.S. PATENT DOCUMENTS

| | | | | |
|---|---|---|---|---|
| 2011/0012869 | A1 | 1/2011 | Klinghult | |
| 2011/0234485 | A1 | 9/2011 | Kitahara et al. | |
| 2014/0055373 | A1* | 2/2014 | Powell | G02F 1/13363 345/173 |
| 2015/0205368 | A1* | 7/2015 | Yairi | G06F 3/046 345/173 |
| 2015/0277633 | A1* | 10/2015 | Jiang | G06F 3/044 345/174 |
| 2016/0342246 | A1* | 11/2016 | Xu | G06F 9/44 |
| 2017/0060291 | A1* | 3/2017 | Chevrier | H03K 17/96 |

FOREIGN PATENT DOCUMENTS

| | | | |
|---|---|---|---|
| CN | 102473050 | A | 5/2012 |
| CN | 104484086 | A | 4/2015 |
| JP | 2005-004274 | A | 1/2005 |
| JP | 2012-113344 | A | 6/2012 |

OTHER PUBLICATIONS

DMC ("Structure and Detection Mechanism of 4wire Resistive Touch Screen," https://web.archive.org/web/20151017080907/https://www.dmccoltd.com/english/structure/4wire.asp, 2015) (Year: 2015).*

The First Chinese Office Action dated Dec. 20, 2017; Appln. No. 201610162051.3.

* cited by examiner

THREE-DIMENSIONAL TOUCH CONTROL STRUCTURE AND DISPLAY DEVICE

FIELD OF THE ART

Embodiments of the invention relate to the field of touch control technologies, more particularly, to a three-dimensional (3D) touch control structure and a display device.

BACKGROUND

Human-Robot interaction (HRI) technologies are among one of the most popular research areas currently, and HRI technologies are moving from system-oriented towards user-oriented. At the same time, identification of movement by human fingers is gradually becoming a principal way of HRI. Currently, in the field of display technologies, HRI is mainly used in touch control.

Conventional touch control screens are mostly capacitive touch control screens. By touching a surface of a touch screen with a finger, there will be changes in an externally coupled capacitance or in electric field. However, such changes can only be used to identify a touch position, while an amount of pressure applied externally cannot be sensed.

SUMMARY

Embodiments of the invention provide a three-dimensional touch control structure and a display device, which can identify not only a touch position but also an amount of pressure being applied.

A first aspect of the invention provides three-dimensional (3D) touch control structure, comprising: a plurality of magnetic field generating components arranged into an array, and a plurality of electromagnetic inducting components in one-to-one correspondence and arranged in different layers to the magnetic field generating components; wherein a distance exists between the magnetic field generating components and the corresponding electromagnetic inducting components, and the magnetic field generating components are configured for generating magnetic fields and the electromagnetic inducting components are configured for changing in induced potential during touch control.

A second aspect of the invention provides display device comprising a display panel and the above 3D touch control structure, wherein the 3D touch control structure is disposed on a light-emitting side of the display panel.

A third aspect of the invention provides a display device, comprising a display panel, wherein the display panel comprises a first substrate cell-assembled to a second substrate, and the display panel further comprises a plurality of magnetic field generating components and a plurality of electromagnetic inducting components, the plurality of magnetic field generating components and the plurality of electromagnetic inducting components are respectively disposed on the first substrate and the second substrate; wherein both the magnetic field generating components and the electromagnetic inducting components are arranged into arrays and in one-to-one correspondence, and the magnetic field generating components are configured for generating magnetic fields and the electromagnetic inducting components are configured for changing in induced potentials during touch control.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
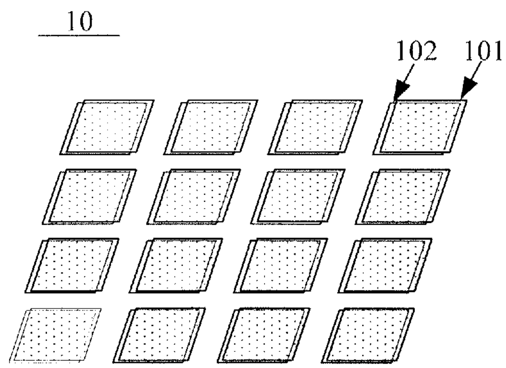
FIG. 1 schematically illustrates a top view of a 3D touch control structure in accordance with an embodiment of the invention.

As illustrated in FIGS. 1 and 2, a 3D touch control structure 10 as provided by an embodiment of the invention comprises: a plurality of magnetic field generating components 101 arranged into an array, and a plurality of electromagnetic inducting components 102 arranged into an array, each of the magnetic field generating components 101 corresponds to one of the electromagnetic inducting components 102 and is arranged in different layers from the electromagnetic inducting components 102. That is, the magnetic field generating components 101 and the electromagnetic inducting components 102 are in one-to-one correspondence.

A distance exists between each of the magnetic field generating components 101 and the corresponding electromagnetic inducting component 102. The magnetic field generating component 101 is configured for generating a magnetic field and the electromagnetic inducting component 102 is configured for changing in induced potential during touch control.

The term of 3D touch control as used in the embodiment of the invention means that it can identify a touch position in the X-Y plane as well as a pressure value along the Z-direction.

Identification of the touch position of the 3D touch control structure on the X-Y plane is based on the following principle. When a finger touches the 3D touch control structure, a distance between the electromagnetic field generating component 101 and the electromagnetic inducting component 102 at the position touched by the finger will be changed as the finger applies a pressure to the 3D touch control structure. As a result, a magnetic flux received by the electromagnetic inducting component 102 will be changed, which further causes an induced potential of the electromagnetic inducting component 102 to be changed, thereby generating an inducted current. Based on the above, it can determine the position of the electromagnetic inducting component 102 whose current or induced potential changes by comparison to surrounding electromagnetic inducting components 102 or direct detection, and thereby obtaining the position of the finger on the X-Y plane.

Figure 2A:
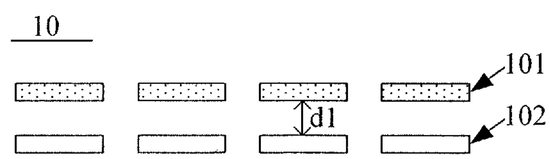
FIG. 2*a* schematically illustrates a cross section view of a 3D in accordance with an embodiment of the invention when not pressed.
Figure 2B:
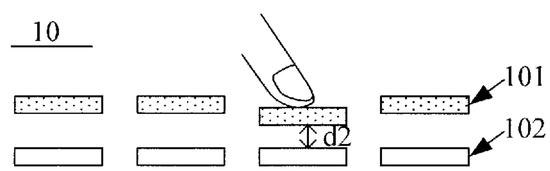
FIG. 2*b* schematically illustrates a cross section view of a 3D in accordance with an embodiment of the invention when being pressed.

Identification of the pressure in the Z direction by the 3D touch control structure is based on the following principle. As illustrated in FIG. 2*a*, before the finger presses the screen, the distance between the electromagnetic field generating component 101 and the electromagnetic inducting component 102 is d1. As illustrated in FIG. 2*b*, when the finger presses, the distance between the electromagnetic field generating component 101 and the electromagnetic inducting component 102 is reduced to d2. The electromagnetic inducting component 102 receives different magnetic fluxes due to different values of d2, which makes the change amount of the induced potential to the electromagnetic inducting component 102 to be different, thereby generating different induced currents. Based on the above, the value of d2 can be determined according to the change amount of the induced potential or the value of the induced current. As different values of d2 correspond to different pressure values, it can thereby identify the pressure values, which in turn allows different functions to be realized based on different pressures.

It is noted that either an alternating voltage or an alternating current applied to the magnetic field generating components 101 may be used to generate the magnetic fields. As for the electromagnetic inducting components 102, it forms a closed loop with the coils and moves to cut magnetic lines of force, such that change in induced potential will happen when the distance from the magnetic field generating components 101 thereto changes.

Moreover, relative positions between the magnetic field generating components 101 and the electromagnetic inducting components 102 will not be defined, as long as the distance between the two components can change when being touched or pressed by a finger.

An embodiment of the invention provides a 3D touch control structure 10. When a touch happens, the electromagnetic inducing component 102 at a position corresponding to the finger will change in the induced potential, which may be used to determine the touch position. Based on that, when the finger applies different pressures during touch, the changes in distance between the magnetic field generating component 101 and the electromagnetic inducing component 102 will be different, making change in the induced potential in the electromagnetic inducing component 102 different. By identifying different pressures, it can thereby realize identification in three dimensions.

Figure 3:
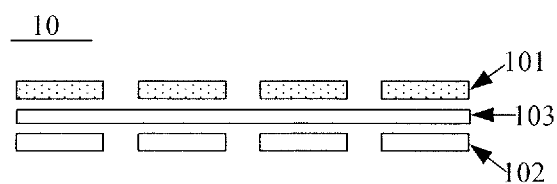
FIG. 3 schematically illustrates a cross section view of a 3D touch control structure in accordance with another embodiment of the invention.

As illustrated in FIG. 3, in at least some of embodiments, an insulation layer 103 is disposed between the magnetic field generating component 101 and the electromagnetic inducing component 102.

A material of the insulation layer may be for example silicon nitride, silicon dioxide or other organic materials.

By this means, when being pressed by the finger, it can prevent short-circuiting the magnetic field generating component 101 and the electromagnetic inducing component 102 caused by too large a pressure.

Figure 4:
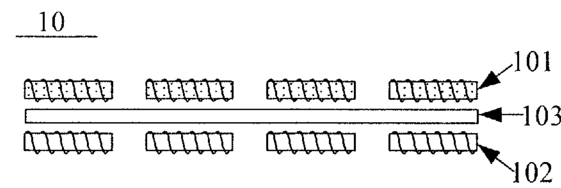
FIG. 4 schematically illustrates a cross section view of another 3D touch control structure in accordance with an embodiment of the invention.

As illustrate in FIG. 4, in at least some of embodiments, both the magnetic field generating components 101 and the electromagnetic inducting components 102 are solenoids. For example, a core is further disposed in the solenoid. When the core is inserted into the electric solenoid, the core is magnetized by the magnetic field generated by the solenoid. Because the magnetized core has become a magnet, the magnetic performance of the solenoid is enhanced due to the superposition of the two magnetic fields.

By configuring the magnetic field generating components 101 as solenoids, magnetic fields may be generated directly when alternating voltages or currents are applied thereto. By configuring the electromagnetic inducing component s102 as solenoids, when their distance to the magnetic field generating components 101 changes, the electromagnetic inducing component s102 can change in potential. Moreover, it can save cost as solenoids are of a simple structure.

In at least some of embodiments, both the magnetic field generating components 101 and the electromagnetic inducting components 102 are transparent. As an example, coils of the solenoids are made of a transparent conductive material.

The transparent conductive material may be ITO, IZO and so on. In this way, when the 3D touch control structure is used in a display device, influence on the display may be prevented.

The coils may be formed by depositing an ITO film and then etching it. Based on that, for large area fabrication, after the coils are formed, the coils may be broken by drilling holes, thereby forming many solenoids insulated from each other.

An embodiment of the invention further provides a display device, comprising a display panel and the above 3D touch control structure 10, wherein the 3D touch control structure 10 is disposed on a light-emitting side of the display panel.

The display device may be a Liquid Crystal Display (LCD), an Organic Light-Emitting Diode (OLED) display and so on.

Figure 5:
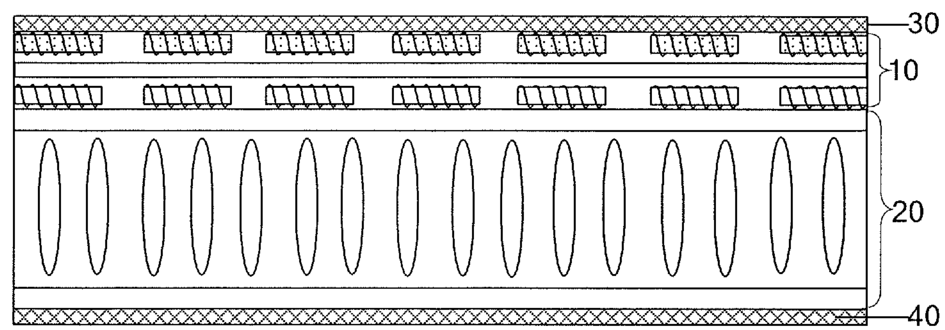
FIG. 5 schematically illustrates a diagram of a display device in accordance with an embodiment of the invention.
Figure 6:
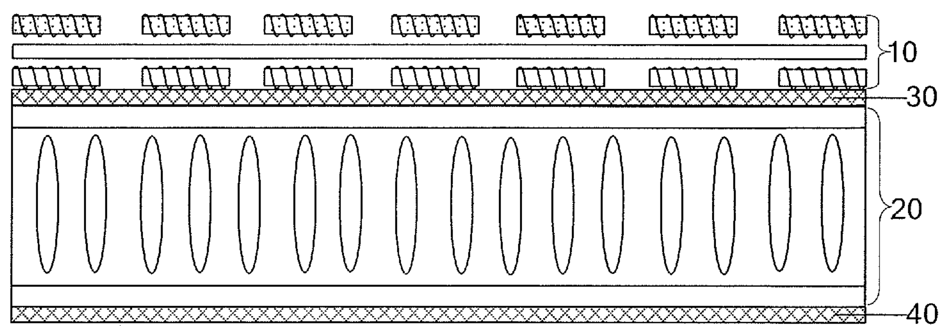
FIG. 6 schematically illustrates a diagram of another display device in accordance with an embodiment of the invention.

When the display device is a LCD, as illustrated in FIGS. 5 and 6, the above display panel is a LCD panel 20. The display device further comprises a front polarizing film 30 disposed on a light-emitting side of the LCD panel 20 and a back polarizing film 40 disposed on an light-incident side of the LCD 20. In this case, the 3D touch control structure 10 may be disposed between the LCD panel 20 and the front polarizing film 30 as illustrated in FIG. 5, or on a side of the front polarizing film 30 away from the LCD panel 20 as illustrated in FIG. 6.

An embodiment of the invention provides a display device. When touch happens, the electromagnetic inducing component 102 at a position corresponding to the finger will change in the induced potential, which may be used to determine the touch position. Based on that, when the finger applies different pressures during touch, the changes in distance between the magnetic field generating component 101 and the electromagnetic inducing component 102 will be different, making changes in the induced potential in the electromagnetic inducing component 102 different. By identifying different pressures, it can thereby realize 3D identification.

Figure 7:
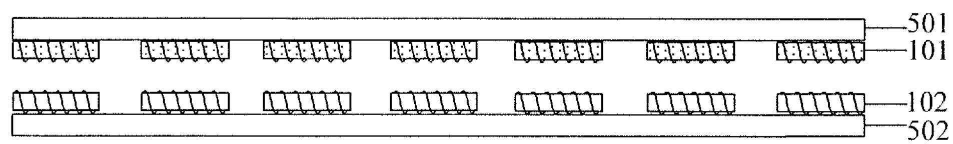
FIG. 7 schematically illustrates a diagram of still another display device in accordance with an embodiment of the invention.

An embodiment of the invention further provides another display device as illustrated in FIG. 7, which comprises a display panel. The display panel comprises a first substrate 501 cell-assembled to a second substrate 502, and the display panel further comprises a plurality of magnetic field generating components 101 and a plurality of electromagnetic inducting components 102, the plurality of magnetic field generating components 101 and the plurality of electromagnetic inducting components 102 are respectively disposed on the first substrate 501 and the second substrate 502.

Both the magnetic field generating components 101 and the electromagnetic inducting components 102 are arranged into arrays and in one-to-one correspondence, and the magnetic field generating components 101 are configured for generating magnetic fields and the electromagnetic inducting components 102 are configured for changing in induced potentials during touch control.

Principles of identification of touch control positions on the X-Y plane and identification of pressures in the Z direction of the embodiment is the same as that of the 3D touch control structure 10 and will not be elaborated here.

It is noted that specific positions of the magnetic field generating components 101 and the electromagnetic inducting components 102 on the first substrate 501 and the second substrate 502 will not be defined here.

Moreover, the magnetic field generating components 101 may be disposed on the first substrate 501 or the second substrate 502. In this case, the electromagnetic inducting components 102 may be disposed on the second substrate 502 or the first substrate 501.

In at least some of embodiments, both the magnetic field generating components 101 and the electromagnetic inducting components 102 are solenoids.

The embodiment of the invention uses solenoids as the magnetic field generating components 101 and the electromagnetic inducting components 102, which are of simple structures and low cost.

In at least some embodiment of the invention, both the magnetic field generating components 101 and the electromagnetic inducting components 102 are transparent.

Based on the above, as there is a distance between the first substrate 501 and the second substrate 502 of the LCD panel, when the magnetic field generating components 101 and the electromagnetic inducting components 102 are used in the LCD panel, it can change the distance between the magnetic field generating components 101 and the electromagnetic inducting components 102 easily when touch happens, thereby making the electromagnetic inducting components 102 change in potentials.

The embodiments of the invention provide a 3D touch control structure and a display device. When touch happens, the electromagnetic inducing component at a position corresponding to the finger will change in the induced potential, which may be used to determine the touch position. Based on that, when the finger applies different pressures during touch, the changes in distance between the magnetic field generating component and the electromagnetic inducing component will be different, making changes in the induced potential in the electromagnetic inducing component different. By identifying different pressures, it can thereby realize 3D identification.

What is described above is related to the illustrative embodiments of the disclosure only and not limitative to the scope of the disclosure; the scopes of the disclosure are defined by the accompanying claims.

The present application claims priority from Chinese Patent Application No. 201610162051.3, filed on Mar. 21, 2016, the disclosure of which is incorporated herein by reference in its entirety.

What is claimed is:

1. A three-dimensional (3D) touch control structure, comprising a plurality of touch control units, the plurality of touch control units being configured for being disconnecting with one another, each of the plurality of touch control units comprises:

a magnetic field generating component, configured for generating a magnetic field; and an electromagnetic inducting component, arranged in one-to-one correspondence to the magnetic field generating component and in different layers from the magnetic field generating component, the electromagnetic inducting component being configured for changing in induced potential during touch control, wherein a distance existing between the magnetic field generating component and a corresponding electromagnetic inducting component and configured for changing at a position of the electromagnetic inducting component touched by a finger, such that x-y coordinates of the position of the finger is solely based on the position of the touch control unit whose induced potential of the electromagnetic inducting component changes, and wherein the magnetic field generating component is configured for being in non-contact with the corresponding electromagnetic inducting component.

2. The 3D touch control structure of claim 1, wherein an insulation layer is disposed between the magnetic field generating component and the electromagnetic inducting component.

3. The 3D touch control structure of claim 2, wherein a material of the insulation layer is silicon nitride, silicon dioxide or other organic materials.

4. The 3D touch control structure of claim 1, wherein coils of the solenoids are made of a transparent conductive material.

5. The 3D touch control structure of claim 1, wherein both the magnetic field generating component and the electromagnetic inducting component are transparent.

6. The 3D touch control structure of claim 1, wherein both the magnetic field generating component and the electromagnetic inducting component have a square shape.

7. A display device comprising a display panel and the 3D touch control structure of claim 1, wherein the 3D touch control structure is disposed on a light-emitting side of the display panel.

8. The display device claim 7, wherein the display panel is a LCD panel and the display device further comprises a front polarizing film disposed on a light-emitting side of the LCD panel.

9. The display device of claim 8, wherein the 3D touch control structure is disposed between the LCD panel and the front polarizing film.

10. The display device of claim 8, wherein the 3D touch control structure is disposed on a side of the front polarizing film away from the LCD panel.

11. A display device, comprising:

a display panel, comprising:

a first substrate, having a plurality of magnetic field generating components disposed thereon, the plurality of magnetic field generating components being configured for generating magnetic fields; and a second substrate, cell-assembled to the first substrate and having a plurality of electromagnetic inducting components disposed thereon, the plurality of electromagnetic inducting components being arranged in one-to-one correspondence to the plurality of magnetic field generating component and in different layers from the plurality of magnetic field generating components, the plurality of electromagnetic inducting components being configured for changing in induced potential during touch control, a distance existing between each of magnetic field generating components and a corresponding electromagnetic inducting component and configured for changing at a position of the electromagnetic inducting component touched by a finger, such that x-y coordinates of the position of the finger is solely based on the position of the electromagnetic inducting component whose induced potential changes, and wherein both the magnetic field generating components and the electromagnetic inducting components are arranged in a planar array comprising rows and columns wherein the magnetic field generating component is configured for being, in non-contact with the corresponding electromagnetic inducting component.

12. The display device of claim 11, wherein coils of the solenoids are made of a transparent conductive material.

13. The display device of claim 11, wherein both the magnetic field generating components and the electromagnetic inducting components are transparent.

14. The display device of claim 11, wherein the display panel is a LCD panel.

* * * * *